United States Patent [19]

Clark et al.

[11] 4,061,442
[45] Dec. 6, 1977

[54] SYSTEM AND METHOD FOR MAINTAINING A LIQUID LEVEL

[75] Inventors: Anthony W. Clark, Carrollton; Rex G. Stubbs, Jr., Garland, both of Tex.

[73] Assignee: Beckett Corporation, Dallas, Tex.

[21] Appl. No.: 619,901

[22] Filed: Oct. 6, 1975

[51] Int. Cl.[2] ...................... F04B 49/00; F25D 17/02; G08B 21/00
[52] U.S. Cl. ........................ 417/36; 62/188; 137/392; 340/244 C
[58] Field of Search ............... 340/244 C; 137/392; 417/36, 44

[56] References Cited

U.S. PATENT DOCUMENTS

| | | | |
|---|---|---|---|
| 2,871,874 | 2/1959 | Coles et al. | 137/392 |
| 2,968,753 | 1/1961 | Mesh | 137/392 |
| 3,131,335 | 4/1964 | Berglund et al. | 73/304 R |
| 3,170,479 | 2/1965 | Mueller | 340/244 C |
| 3,397,715 | 8/1968 | Fathauer | 137/392 |
| 3,484,805 | 12/1969 | Lorenz | 137/392 |
| 3,509,825 | 5/1970 | Sorensen | 137/392 |
| 3,540,027 | 11/1970 | Rauth et al. | 340/244 C |
| 3,584,643 | 6/1971 | Burke | 340/244 C |
| 3,602,251 | 8/1971 | Hill | 137/392 |
| 3,667,022 | 9/1970 | Quinn | 417/36 |
| 3,757,317 | 9/1971 | Kahn | 137/392 |
| 3,760,600 | 9/1973 | Matsui | 62/188 |
| 3,787,733 | 1/1974 | Peters | 137/392 |
| 3,916,213 | 10/1975 | Luteran | 137/392 |

OTHER PUBLICATIONS

Fisher et al. Publication, A Liquid Nitrogen Level Regulation, 6/1972, Published by Cryogenics, p. 240 of June 1972 issue.

Primary Examiner—William L. Freeh
Attorney, Agent, or Firm—Richards, Harris & Medlock

[57] ABSTRACT

The specification discloses a technique for controlling a pump to maintain a body of liquid below a maximum liquid level. A low voltage high frequency signal is applied to a conductive first probe which extends to a desired maximum liquid level. The high frequency signal is also applied to an electronic detector and switching circuit in order to maintain the switching circuit in a first state when the liquid level does not contact the first probe. The effect of the application of the high frequency signal to the switching circuit is reduced when the liquid level contacts the first probe, thereby changing the switching circuit to a second state. A pump is then energized to lower the liquid level in response to the second state of the switching circuit. A second probe is then coupled to receive the high frequency signal. The second probe extends to a lower level than does the first probe, thereby maintaining the pump in an energized state until the liquid level falls below the second probe. A safety overflow probe and circuitry is provided to prevent overflow in case of malfunction of the system.

9 Claims, 2 Drawing Figures

SYSTEM AND METHOD FOR MAINTAINING A LIQUID LEVEL

FIELD OF THE INVENTION

This invention relates to liquid level control systems, and more particularly relates to a method and apparatus for controlling a pump to maintain a maximum liquid level.

THE PRIOR ART

A wide variety of detection devices have been heretofore utilized in order to control the operation of a pump to maintain a desired maximum liquid level for condensate pans, sump pump and the like. One type of prior system utilizes conductive probes extending to different levels, with a relatively high D.C. voltage being applied to the probes in order to enable detection of the liquid level. When such a system is utilized with conductive liquid, such as in conjunction with condensate pans for air conditioners, the D.C. voltage often can cause plating and deterioration of the probes. In addition, such prior systems entail the application of a superimposed line potential to the liquid, thereby presenting a dangerous electrical condition. A need has thus arisen for a liquid sensing system which does not require high D.C. voltage application to sensing probes, but which provides very sensitive and accurate liquid level control.

SUMMARY OF THE INVENTION

In accordance with the present invention, a system is provided for controlling a pump to maintain a maximum level. A conductive probe is suspended above a body of liquid and extends to a maximum desired liquid level. An oscillator is coupled to the probe for generating a low voltage signal having a predetermined frequency. A switch is responsive to the probe and to the oscillator for energizing the pump when the body of liquid rises into contact with the probe.

In accordance with another aspect of the invention, a method of maintaining a desired maximum liquid level includes applying a low voltage high frequency signal to a probe which extends to the desired maximum liquid level. The high frequency signal is applied to an electronic switch when the liquid level does not contact the probe, in order to maintain the switch in a first state. The effect of the application of the high frequency signal to the switch is reduced when the liquid level contacts the probe, in order to change the switch to a second state. The liquid level is then lowered in response to the second state of the switch.

In accordance with yet a more specific aspect of the invention, a liquid level control system includes first and second conductive probes suspended above a body of liquid and extending below a maximum desired level. A third conductive probe is suspended above the body of liquid and extends downwardly to the maximum desired level. An oscillator is normally coupled to the first and third probes for generating a high frequency signal. An electronic switch is coupled to the probes and the oscillator. The switch is switched to a first state in response to the high frequency signal when the liquid level does not contact the third probe and is switched to a second state when the liquid level contacts the third probe. Circuitry is responsive to the second state of the switch for coupling the second probe to the oscillator, wherein the switch is maintained in the second state as long as the liquid level contacts the second probe. A pump is responsive to the second state of the switch for lowering the liquid level of the body of liquid.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
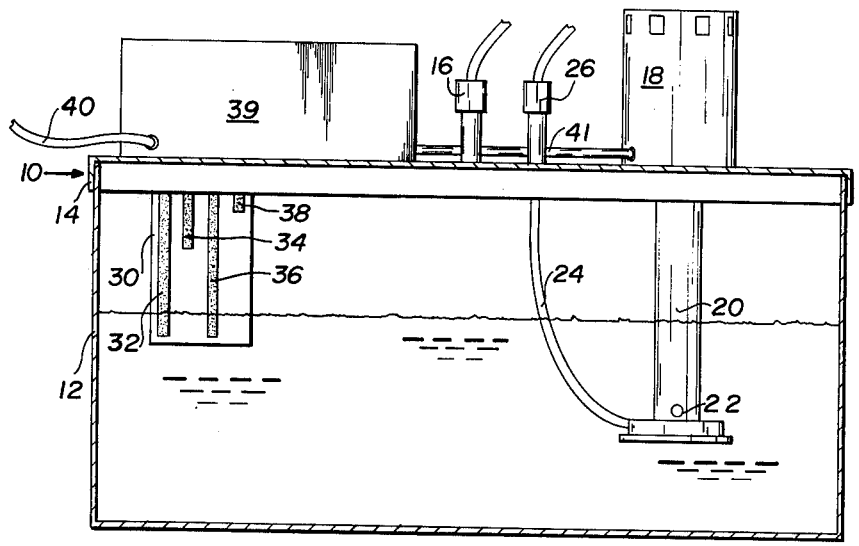
FIG. 1 is a sectional view through a condensate collection pan which includes the present invention.

Referring to FIG. 1, the present liquid level control system is shown in a liquid condensate collection apparatus generally identified by the numeral 10. Although the condensate collection apparatus is shown, it will be understood that the present invention may be used with sump pumps or the like. Apparatus 10 includes a condensate collection pan 12 which includes a lid 14. An inlet 16 is mounted in lid 14 and is connected to receive liquid from a suitable source. A pump 18 is mounted on lid 14 and includes an extension 20 which extends into the body of liquid. An inlet aperture 22 draws in the liquid when the pump is energized and pumps the liquid upwardly through tube 24 and out an outlet 26. It will be understood that the present system may be utilized in a variety of liquid level control environments. Apparatus 10 may be used, for example, to collect water condensate from large air conditioners, fountains and the like, and the present system may be utilized to insure that the condensate level does not rise above a predetermined maximum level.

A thin probe support member 30 extends downwardly from the underside of the lid 14. The support member 30 is formed of insulating material and includes thereon four conductive probes or electrodes 32, 34, 36 and 38. In the preferred embodiment, probes 32-38 are formed from gold strips which adhere to the surface of support 30. Probes 32 and 36 extend substantially along the length of the support member 30 to a desired lower level. Probe 34 extends downwardly to the desired maximum liquid level within the pan 12. Probe 38 extends to a location above probe 34 and serves as a safety overflow detector. Probes 32-38 are connected to electronic level control circuitry contained within a housing 39 mounted on the top of lid 14.

Power is supplied to the pump 18 through the housing 39 from a source of line voltage through wire cords 40 and 41. In accordance with the present invention, the pan 12 and probes 32-38 are substantially isolated from the line voltage applied to the pump 18, thereby providing safety of operation of the system. Moreover, as will be subsequently described, the probes 32-38 do not receive high D.C. voltage, and thus are not subject to substantial corroding, plating or the like.

Figure 2:
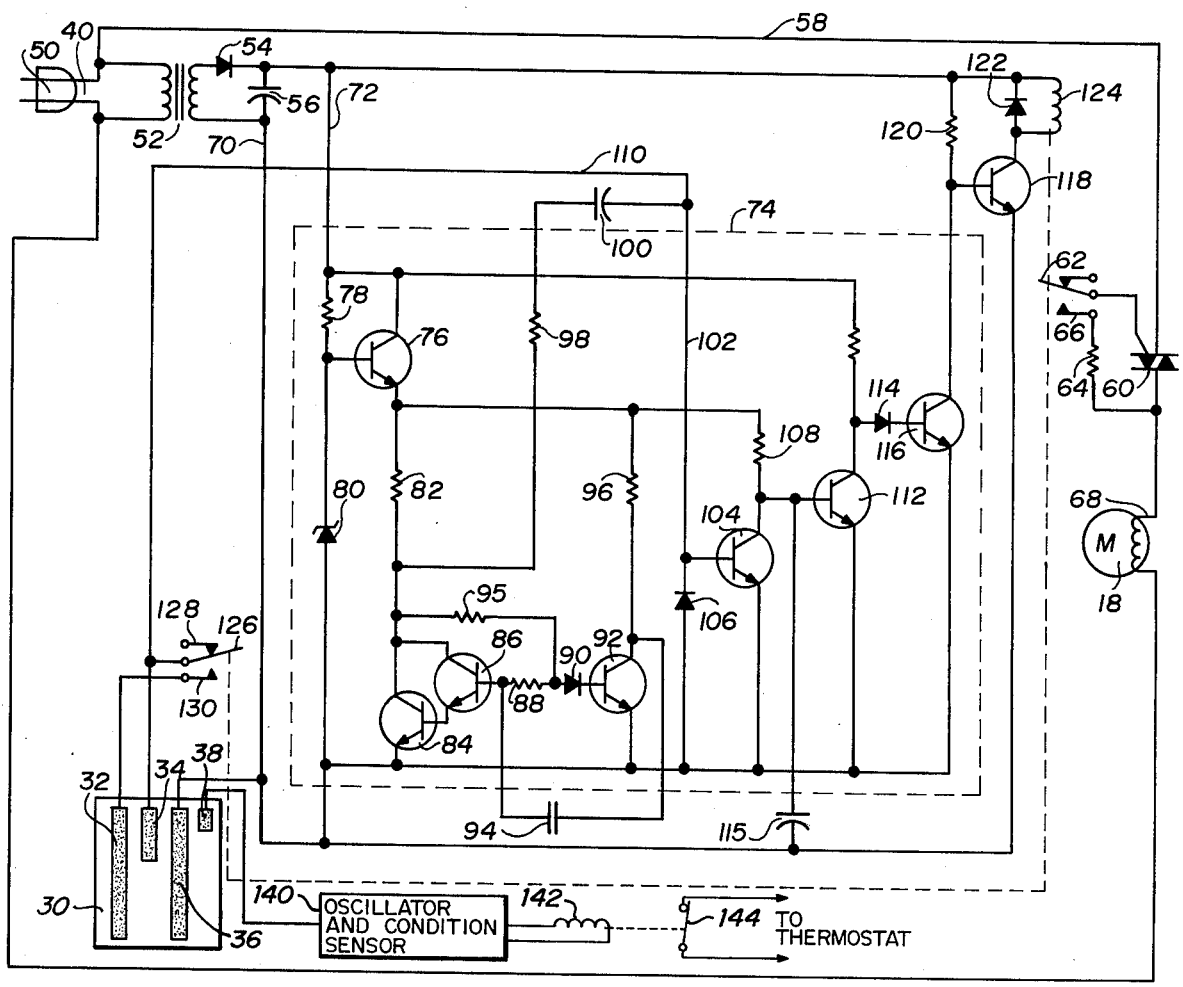
FIG. 2 is an electrical schematic diagram of the electronic liquid level control system of the invention.

FIG. 2 illustrates the electronic liquid level control circuitry of the invention. A plug 50 is adapted to be plugged into a source of conventional line voltage to supply line voltage to the wires 41. The line voltage is applied through a step down transformer 52, one terminal of which is applied to a diode 54. A capacitor 56 is connected between the cathode of the diode 54 and the second terminal of the transformer secondary.

The line voltage is applied through a lead 58 to a terminal of a normally nonconductive triac 60. The gate terminal of the triac 60 is connected to a relay switch 62 which is normally maintained in the illustrated open position. A resistor 64 is connected between relay contact 66 and the third terminal of the triac 60 in order to energize the triac 60 when the switch 62 closes on the contact 66. Triac 60 is connected in series with with the motor winding 68 of the pump 18, previously shown in FIG. 1. In the illustrated position, the triac 60 is de-energized and the motor of pump 18 is de-energized.

The secondary of the transformer 52 is connected via leads 70 and 72 to a high frequency oscillator and condition sensor contained within the dotted line rectangle 74. The oscillator and condition sensor may comprise the LM1830 circuit manufactured and sold by National Semiconductor Corporation of Santa Clara, California.

The high frequency oscillator includes a transistor 76 connected at its collector to lead 72. The resistor 78 is connected between the transistor collector and the base of transistor 76. A zener diode 80 is connected between the base of transistor 76 and circuit ground. The emitter of transistor 76 is applied through a resistance 82 to the collectors of interconnected transistors 84 and 86. The base of transistor 86 is coupled through a resistance 88 and a diode 90 to the base of a transistor 92. A capacitor 94 is provided to set the frequency of the high frequency oscillator and is connected between the base of transistor 86 and the collector of transistor 92. A resistor 95 is tied between the collectors of transistors 84 and 86 and between the resistor 88 and diode 90. The biasing resistor 96 is tied between the collector of transistor 92 and the emitter of transistor 76.

The illustrated oscillator generates a low voltage signal having a voltage level of only a few volts and a predetermined frequency, which in the preferred embodiment is in the range of 10 kHz, although it will be understood that the set frequency may be varied for different applications. The resulting high frequency signal is applied through a resistance 98 and a capacitance 100 to lead 102 which is tied to the base of a transistor 104. Transistor 104 is normally maintained in a conductive state due to the application of the high frequency signal applied via lead 102. In the preferred embodiment, the high frequency signal is provided with a square-wave configuration sufficient to drive the transistor 104 into conduction. A diode 106 is connected across the base of transistor 104 and circuit ground, while a bias resistor 108 is connected to the collector of transistor 104.

The high frequency signal is also applied via lead 110 to the probe 34. Due to the fact that the voltage of the high frequency signal is relatively low, and comprises a high frequency alternating signal, plating problems do not occur with respect to probe 34.

The collector of transistor 104 is applied to the base of a normally nonconductive transistor 112 and the base of transistor 112 is applied through a capacitor 115 to circuit ground. The collector of transistor 112 is applied through a diode 114 to the base of a normally conductive transistor 116. The collector of transistor 116 is connected to the base of a normally nonconductive transistor 118. The base of transistor 116 is tied to the secondary of transformer 52 through a resistor 120. The collector of transistor 118 is connected to the anode of a diode 122 which is connected across a relay winding 124. Relay winding 124 controls the operation of relay switch 62 and also the operation of relay switch 126. In the normal position, relay switch 126 is in contact with contact 128. When relay winding 124 is energized, relay switch 126 is moved into contact with relay switch contact 130. Probe 32 is normally not connected to the circuit. When relay switch contact 126 is moved into contact with relay contact 130, probe 32 is coupled to the circuit. Probe 36 is connected to circuit ground.

Probe 38 is connected to a second high frequency oscillator and condition sensor 140 which comprises the same circuitry within the dotted line rectangle 74. Sensor 140 may then comprise a second LM1830 circuit operable to sense when the liquid level contacts probe 38.

Sensor 140 controls the operation of a normally energized relay coil 142 which operates a relay switch 144. Switch 144 is connected in series with the thermostat of the air conditioner or other unit.

In operation of the system, it will first be assumed that the liquid level is either below probes 32 and 36 or in contact with probes 32 and 36, but below the probe 34. In this state, the system is interconnected as shown in FIG. 2, and the oscillator applies a 10 kHz low voltage signal to probe 34 and to the base of transistor 104. Probe 34 is provided with a relatively high resistance, inasmuch as it is disposed in air. In the preferred embodiment, the probe 34 is provided with a resistance of over 15 K ohms, and thus the transistor 104 is driven into conduction by the high frequency signal. The conduction of transistor 104 maintains transistors 112 and 118 in a nonconductive state. Relay 124 is not energized, and thus the relay contact 62 maintains a triac in a nonconductive state. Relay switch 126 maintains the probe 34 coupled to the circuit, with the probe 32 remaining decoupled from the circuit. The motor of the pump 18 is de-energized.

When the level of liquid within the pan 12 rises into contact with probe 34, the resistance of the probe 34 drops below its previous level of 15 K ohms. This drop in resistance is detected by the detector transistor 104, and the square-wave output from the oscillator is no longer effective to maintain the transistor 104 in conduction. Consequently, transistor 104 becomes nonconductive. This causes transistor 112 to become conductive, which in turn causes transistor 116 to become non-conductive. This in turn causes normally off transistor 118 to become conductive, thereby allowing current flow through the relay coil 124. Relay coil 124 is thus energized, and switches relay switches 62 and 126 into contact with relay contacts 66 and 130, respectively. Triac 60 is thus energized, and line voltage is applied to the motor coil 68 in order to energize the pump 18. The pump 18 thus pumps water through the inlet 22 and out the tube 24 in order to lower the level of water in the pan 12. Energization of the relay coil 124 also causes the relay switch 126 to couple the probe 32 into the circuit. Consequently, the effective low resistance detected by the transistor 104 remains essentially the same and, the transistor 104 remains nonconductive as long as liquid contacts probe 32. In this manner, relay coil 124 remains energized in order to maintain the pump on until the water level drops below the end of probe 32.

When the water level falls below the ends of probes 32 and 36, the resistance of the probe 32 increases, thereby allowing the output of the oscillator to drive the transistor 104 into conduction. This causes transistors 112 and 118 to become nonconductive. The current flow through relay coil 124 is terminated, and thus the relay switch is opened to the normal position. Triac 60 becomes nonconductive and thus the motor 18 is de-energized, while probe 32 is decoupled from the circuit. The circuit remains in this state until the liquid level again rises into contact with probe 34, whereupon the previous operation repeats itself.

If the liquid level rises into contact with probe 38, such as in case of a malfunction of the previously sensing circuitry, the sensor 140 senses this condition and de-energizes relay coil 142. Relay switch 144 thus opens, shutting down the air conditioning or other unit in order to prevent damage. Sensor 140 is constructed and operates identically to the sensor in the dotted line rectangle 74. The safety probe 38 and its associated circuitry thus takes the place of a mechanical safety float valve which is subject to malfunction.

It will thus be seen that the present invention provides a very safe and accurate liquid level sensing system. The probes of the invention are essentially decoupled from the line voltage applied to the pump 18. Only very low voltage high frequency signals are applied to the conductive probes, and therefore plating and destructive deterioration is inhibited. The present system does not therefore require high D.C. voltage to be applied to the water and to the condensate pan, and is therefore much safer than previously developed systems.

Whereas the present invention has been developed with respect to specific embodiments thereof, it will be understood that various changes and modifications will be suggested to one skilled in the art, and it is intended to encompass such changes and modifications as fall within the scope of the appended claims.

What is claimed is:

1. A liquid level control system for an air conditioner comprising:
   first and second conductive probes suspended above a body of liquid and extending below a maximum desired level,
   a third conductive probe suspended above the body of liquid and extending downwardly to said maximum desired level,
   an oscillator normally coupled to said first and third probes for generating a high frequency signal,
   electronic switching means coupled to said probes and said oscillator, said switching means being switched to a first state in response to said high frequency signal when the liquid level does not contact said third probe and being switched to a second state when the liquid level contacts said third probe,
   means responsive to said second state of said switching means for coupling said second probe to said oscillator, wherein said switching means is maintained in said second state as long as the liquid level contacts said second probe,
   pump means responsive to said second state of said switching means for lowering the liquid level of the body of liquid, and
   a fourth safety overflow prevention conductive probe connected to terminate operation of said air conditioner if the liquid level rises to a predetermined oveflow level.

2. The system of claim 1 and further comprising:
   a pan for receiving conductive liquid condensate to form the body of liquid.

3. The system of claim 1 wherein said first, second and third probes comprise:
   conductive metal strips formed on an insulating surface and suspended over the body of liquid.

4. The system of claim 1 wherein the effective resistance of said third probe is reduced by contact with the liquid in order to cause said switching means to be switched to said second state.

5. The system of claim 1 wherein said switching means comprises:
   a transistor detection circuit for changing states in response to contact by said third probe with the liquid,
   a relay responsive to said detection circuit for becoming energized, and
   a triac responsive to said relay for applying line voltage to energize said pump means.

6. The system of claim 1 wherein a line voltage is applied to energize said pump means, said probes being substantially isolated from said line voltage.

7. The system of claim 1 and further comprising:
   a second oscillator coupled to said fourth probe for generating a second high frequency signal,
   second electronic switching means connected to said fourth probe and said second oscillator for switching from a first state to a second state when the liquid level contacts said second probe, and
   means responsive to said switching means for terminating operation of said air conditioner.

8. The system of claim 1 wherein said switching means comprises:
   a plural transistor detector circuit having multiple states of condition.

9. The system of claim 8 wherein one of said transistors in said detector circuit is normally maintained in the conductive mode by said high frequency signal.

* * * * *